US006891847B1

(12) United States Patent
Gubbi

(10) Patent No.: US 6,891,847 B1
(45) Date of Patent: May 10, 2005

(54) METHOD AND APPARATUS FOR ACCOMMODATING ASYNCHRONOUS DATA TRANSMISSIONS IN A WIRELESS COMPUTER NETWORK

(75) Inventor: Rajugopal R. Gubbi, Fair Oaks, CA (US)

(73) Assignee: Share Wave, Inc., El Dorado Hills, CA (US)

( * ) Notice: Subject to any disclaimer, the term of this patent is extended or adjusted under 35 U.S.C. 154(b) by 0 days.

(21) Appl. No.: 09/405,821

(22) Filed: Sep. 24, 1999

Related U.S. Application Data

(63) Continuation-in-part of application No. 09/151,579, filed on Sep. 11, 1998.

(51) Int. Cl.$^7$ ............................................. H04J 3/16
(52) U.S. Cl. .................... 370/442; 370/459; 370/462; 455/450
(58) Field of Search ............................. 370/314, 328, 370/329, 345, 347, 360, 366, 368, 369, 375, 378, 379, 442, 443, 459–462, 376; 455/450–453

(56) References Cited

U.S. PATENT DOCUMENTS

| | | | | | |
|---|---|---|---|---|---|
| 4,538,261 A | * | 8/1985 | Kume | ......................... | 370/229 |
| 5,446,735 A | * | 8/1995 | Tobagi et al. | ............... | 370/445 |
| 5,481,541 A | * | 1/1996 | Gareh | ......................... | 370/462 |
| 5,513,210 A | * | 4/1996 | Vook et al. | .................. | 375/133 |
| 5,544,075 A | * | 8/1996 | Janex | ......................... | 370/230 |
| 5,648,958 A | * | 7/1997 | Counterman | ................. | 370/458 |
| 5,682,604 A | * | 10/1997 | Kashi | .......................... | 370/448 |
| 5,774,658 A | * | 6/1998 | Kalkunte et al. | ........... | 709/230 |
| 5,787,080 A | * | 7/1998 | Hulyalkar et al. | .......... | 370/348 |
| 5,819,182 A | * | 10/1998 | Gardner et al. | ............. | 455/524 |
| 5,870,388 A | * | 2/1999 | Yung et al. | .................. | 370/260 |
| 5,896,385 A | * | 4/1999 | Achilleoudis | ............... | 370/443 |
| 6,111,862 A | * | 8/2000 | Kaplan | ....................... | 370/287 |
| 6,320,869 B1 | * | 11/2001 | Van Driel et al. | .......... | 370/443 |

* cited by examiner

*Primary Examiner*—Steven Nguyen
*Assistant Examiner*—Roberta Stevens
(74) *Attorney, Agent, or Firm*—Thompson & Knight LLP; James J. Murphy

(57) ABSTRACT

Transmissions within a communication channel utilized by devices of a computer network that are outside of a device's designated time slot are accommodated through the use of a clear channel assessment time. The clear channel assessment time takes into account the device's designated transmission time slot within the communication channel with respect to those of other network devices. Thus, the clear channel assessment time may be a time period that is the product of a predetermined clear channel waiting time and a numerical representation of the difference between the device's designated transmission time slot within the communication channel and that of another network device that completed a preceding transmission. The clear channel waiting time may be specified by a network master device as part of a network connection process and the transmissions within the channel outside of a device's designated time slot may be accommodated after all regularly scheduled transmissions within the channel during a network frame period have been completed.

13 Claims, 3 Drawing Sheets

METHOD AND APPARATUS FOR ACCOMMODATING ASYNCHRONOUS DATA TRANSMISSIONS IN A WIRELESS COMPUTER NETWORK

RELATED APPLICATION

This application is a continuation-in-part of co-pending application Ser. No. 09/151,579, entitled "Method and Apparatus for Accessing a Computer Network Communication Channel", filed Sep. 11, 1998, by Rajugopal R. Gubbi, Natarajan Ekambaram and Nirmalendu Bikash Patra, and assigned to the Assignee of the present application.

FIELD OF THE INVENTION

The present invention relates generally to a scheme for communications within a computer network and, in particular, to asynchronous communications as occur between a central server and one or more clients across a wireless communications link.

BACKGROUND

Modern computer networks allow for intercommunication between a number of nodes such as personal computers, workstations, peripheral units and the like. Network links transport information between these nodes, which may sometimes be separated by large distances. However, to date most computer networks have relied on wired links to transport this information. Where wireless links are used, they have typically been components of a very large network, such as a wide area network, which may employ satellite communication links to interconnect network nodes separated by very large distances. In such cases, the transmission protocols used across the wireless links have generally been established by the service entities carrying the data being transmitted, for example, telephone companies and other service providers.

In the home environment, computers have traditionally been used as stand-alone devices. More recently, however, there have been some steps taken to integrate the home computer with other appliances. For example, in so-called "Smart Homes", computers may be used to turn on and off various appliances and to control their operational settings. In such systems, wired communication links are used to interconnect the computer to the appliances that it will control. Such wired links are expensive to install, especially where they are added after the original construction of the home.

In an effort to reduce the difficulties and costs associated with wired communication links, some systems for interconnecting computers with appliances have utilized analog wireless links for transporting information between these units. Such analog wireless links operate at frequencies commonly utilized by wireless telephones. Although easier to install than conventional wired communication links, analog wireless communication links suffer from a number of disadvantages. For example, degraded signals may be expected on such links because of multipath interference. Furthermore, interference from existing appliances, such as televisions, cellular telephones, wireless telephones and the like may be experienced. Thus, analog wireless communication links offer less than optimum performance for a home environment.

In the above-referenced co-pending application Ser. No. 09/151,579, which is incorporated herein by reference, a computer network employing a digital, wireless communication link adapted for use in the home environment was described. That architecture included a number of network components arranged in a hierarchical fashion and communicatively coupled to one another through communication links operative at different levels of the hierarchy. At the highest level of the hierarchy, a communication protocol that supports dynamic addition of new network components at any level of the hierarchy according to bandwidth requirements within a communication channel operative at the highest level of the network hierarchy is used.

The generalization of this network structure is shown in FIG. 1. A subnet 10 includes a server 12. In this scheme, the term "subnet" is used to describe a cluster of network components that includes a server and several clients associated therewith (e.g., coupled through the wireless communication link). Depending on the context of the discussion however, a subnet may also refer to a network that includes a client and one or more subclients associated therewith. A "client" is a network node linked to the server through the wireless communication link. Examples of clients include audio/video equipment such as televisions, stereo components, personal computers, satellite television receivers, cable television distribution nodes, and other household appliances.

Server 12 may be a separate computer that controls the communication link, however, in other cases server 12 may be embodied as an add-on card or other component attached to a host computer (e.g., a personal computer) 13. Server 12 has an associated radio 14, which is used to couple server 12 wirelessly to the other nodes of subnet 10. The wireless link generally supports both high and low bandwidth data channels and a command channel. Here a channel is defined as the combination of a transmission frequency (more properly a transmission frequency band) and a pseudo-random (PN) code used in a spread spectrum communication scheme. In general, a number of available frequencies and PN codes may provide a number of available channels within subnet 10. As is described in the co-pending application cited above, servers and clients are capable of searching through the available channels to find a desirable channel over which to communicate with one another.

Also included in subnet 10 are a number of clients 16, some of which have shadow clients 18 associated therewith. A shadow client 18 is defined as a client which receives the same data input as its associated client 16 (either from server 12 or another client 16), but which exchanges commands with server 12 independently of its associated client 16. Each client 16 has an associated radio 14, which is used to communicate with server 12, and some clients 16 may have associated subclients 20. Subclients 20 may include keyboards, joysticks, remote control devices, multi-dimensional input devices, cursor control devices, display units and/or other input and/or output devices associated with a particular client 16. A client 16 and its associated subclients 20 may communicate with one another via communication links 21, which may be wireless (e.g., infra-red, ultrasonic, spread spectrum, etc.) communication links.

Each subnet 10 is arranged in a hierarchical fashion with various levels of the hierarchy corresponding to levels at which intra-network component communication occurs. At a highest level of the hierarchy exists the server 12 (and/or its associated host 13), which communicates with various clients 16 via the wireless radio channel. At other, lower levels of the hierarchy the clients 16 communicate with their various subclients 20 using, for example, wired communication links or wireless communication links such as infra-red links.

Where half-duplex radio communication is used on the wireless link between server 12 and clients 16, a communication protocol based on a slotted link structure with dynamic slot assignment is employed. Such a structure supports point-to-point connections within subnet 10 and slot sizes may be re-negotiated within a session. Thus a data link layer that supports the wireless communication can accommodate data packet handling, time management for packet transmission and slot synchronization, error correction coding (ECC), channel parameter measurement and channel switching. A higher level transport layer provides all necessary connection related services, policing for bandwidth utilization, low bandwidth data handling, data broadcast and, optionally, data encryption. The transport layer also allocates bandwidth to each client 16, continuously polices any under or over utilization of that bandwidth, and also accommodates any bandwidth renegotiations, as may be required whenever a new client 16 comes on-line or when one of the clients 16 (or an associated subclient 20) requires greater bandwidth.

The slotted link structure of the wireless communication protocol for the transmission of real time, multimedia data (e.g., as frames) within a subnet 10 is shown in FIG. 2. At the highest level within a channel, forward (F) and backward or reverse (B) slots of fixed (but negotiable) time duration are provided within each frame transmission period. During forward time slots F, server 12 may transmit video and/or audio data and/or commands to clients 16, which are placed in a listening mode. During reverse time slots B, server 12 listens to transmissions from the clients 16. Such transmissions may include audio, video or other data and/or commands from a client 16 or an associated subclient 20. At the second level of the hierarchy, each transmission slot (forward or reverse) is made up of one or more radio data frames 40 of variable length. Finally, at the lowest level of the hierarchy, each radio data frame 40 is comprised of server/client data packets 42, which may be of variable length.

Each radio data frame 40 is made up of one server/client data packet 42 and its associated error correction coding (ECC) bits. Variable length framing is preferred over constant length framing in order to allow smaller frame lengths during severe channel conditions and vice-versa. This adds to channel robustness and bandwidth savings. Although variable length frames may be used, however, the ECC block lengths are preferably fixed. Hence, whenever the data packet length is less than the ECC block length, the ECC block may be truncated (e.g., using conventional virtual zero techniques). Similar procedures may be adopted for the last block of ECC bits when the data packet is larger.

As shown in the illustration, each radio data frame 40 includes a preamble 44, which is used to synchronize pseudo-random (PN) generators of the transmitter and the receiver. Link ID 46 is a field of fixed length (e.g., 16 bits long for one embodiment), and is unique to the link, thus identifying a particular subnet 10. Data from the server 12/client 16 is of variable length as indicated by a length field 48. Cyclic redundancy check (CRC) bits 50 may be used for error detection/correction in the conventional fashion.

For the illustrated embodiment then, each frame 52 is divided into a forward slot F, a backward slot B, a quiet slot Q and a number of radio turn around slots T. Slot F is meant for server 12-to-clients 16 communication. Slot B is time shared among a number of mini-slots $B_1$, $B_2$, etc., which are assigned by server 12 to the individual clients 16 for their respective transmissions to the server 12. Each mini-slot $B_1$, $B_2$, etc. includes a time for transmitting audio, video, voice, lossy data (i.e., data that may be encoded/decoded using lossy techniques or that can tolerate the loss of some packets during transmission/reception), lossless data (i.e., data that is encoded/decoded using lossless techniques or that cannot tolerate the loss of any packets during transmission/reception), low bandwidth data and/or command (Cmd.) packets. Slot Q is left quiet so that a new client may insert a request packet when the new client seeks to log-in to the subnet 10. Slots T appear between any change from transmit to receive and vice-versa, and are meant to accommodate individual radios' turn around time (i.e., the time when a half-duplex radio 14 switches from transmit to receive operation or vice-versa). The time duration of each of these slots and mini-slots may be dynamically altered through renegotiations between the server 12 and the clients 16 so as to achieve the best possible bandwidth utilization for the channel. Note that where full duplex radios are employed, each directional slot (i.e., F and B) may be full-time in one direction, with no radio turn around slots required.

Forward and backward bandwidth allocation depends on the data handled by the clients 16. If a client 16 is a video consumer, for example a television, then a large forward bandwidth is allocated for that client. Similarly if a client 16 is a video generator, for example a video camcorder, then a large reverse bandwidth is allocated to that particular client. The server 12 maintains a dynamic table (e.g., in memory at server 12 or host 13), which includes forward and backward bandwidth requirements of all on-line clients 16. This information may be used when determining whether a new connection may be granted to a new client. For example, if a new client 16 requires more than the available bandwidth in either direction, server 12 may reject the connection request. The bandwidth requirement (or allocation) information may also be used in deciding how many radio packets a particular client 16 needs to wait before starting to transmit its packets to the server 12. Additionally, whenever the channel conditions change, it is possible to increase/reduce the number of ECC bits to cope with the new channel conditions. Hence, depending on whether the information rate at the source is altered, it may require a dynamic change to the forward and backward bandwidth allocation.

The use of the slotted link communication architecture described above can present challenges for accommodating asynchronous data transmissions within a subnet 10. For example, consider a file transfer process between a network master (e.g., server 12) and a client 16 that takes place in an operating environment under the control of the Windows™ operating system (or one of its variants) produced by Microsoft corporation of Redmond, Wash. In such a transfer, the requesting entity (i.e., the network resource, say a personal computer, requesting the transfer of data) initiates the transfer by sending a Server Message Block (SMB) protocol command to open the file on the target platform (e.g., a server or another personal computer storing the requested material). The target device responds with another SMB command and supplies the requesting device with a pointer to the requested file. The requesting device, using this pointer, then reads a block of N-bytes from the designated file, specifying the block size using an offset from the pointer provided by the target device. In response, the target device reads N-bytes worth of data from the subject file and delivers this information to a transmission control protocol/internet protocol (TCP/IP) (assuming this is the transfer protocol being used) layer that handles communication between the devices. The TCP/IP layer fragments the N-bytes of data into smaller TCP/IP packets and begins transmitting the packets to the requesting device across the communication channel. As the requesting device receives the packets, it transmits acknowledgements back to the target device. After the last packet for the N-byte transfer has been received and acknowledged, the requesting device transmits another SMB request for the next block of M-bytes from the subject file. M and N may be the same or different, and this process continues until the file transfer is complete.

The above transfer process is serialized under the control of the SMB requests and subsequent responses. This serialization is necessary because the SMB layer on the requesting platform waits for the arrival of the last packet in the previously requested portion of the file before sending the next request. Because of this serialization, the wireless communication channel may be idle during the response times between the SMB and TCP/IP layers on both sides of the transaction. Furthermore, because the underlying wireless communication channel is a time division multiple access (TDMA)-based architecture, any delay in these responses can cause the transmitting device to miss its allocated slot time and, hence, result in increased latency. Thus, it would be desirable to have a mechanism for avoiding such latencies in a wireless communication scheme for a computer network.

SUMMARY OF THE INVENTION

In one embodiment, transmissions within a communication channel utilized by devices of a computer network that are outside of a device's designated time slot are accommodated through the use of a clear channel assessment time. The clear channel assessment time takes into account the device's designated transmission time slot within the communication channel with respect to those of other network devices. Thus, the clear channel assessment time may be a time period that is the product of a predetermined clear channel waiting time and a numerical representation of the difference between the device's designated transmission time slot within the communication channel and that of another network device that completed a preceding transmission. The clear channel waiting time may be specified by a network master device as part of a network connection process and the transmissions within the channel outside of a device's designated time slot may be accommodated after all regularly scheduled transmissions within the channel during a network frame period have been completed.

In another embodiment a clear channel assessment that takes into account a first device's designated transmission time slot within a communication channel with respect to those of other network devices in order to determine idle times that exist after completion of regularly scheduled transmissions within the communication channel is provided. The first device may transmit within the common communication channel upon an indication that the channel is available for transmission. Such indication is preferably made upon the expiration of a time period that is the product of a predetermined clear channel waiting time and a numerical representation of the difference between the first device's designated transmission time slot within the communication channel with respect to that of another network device. This predetermined clear channel waiting time may be designated by a network master device upon a connection thereto by the first device.

In still another embodiment, a network client having a clear channel assessment indicator and being configured to transmit within a communication channel of a computer network at a time determined in part by a notification from the clear channel assessment indicator and in part by transmission characteristics of other devices transmitting within the channel is provided. These transmission characteristics may include a numerical difference between a designated transmission slot for the network client and that of at least one of the other devices. In some cases, the channel is a time division multiplexed wireless communication channel.

In a further embodiment, a scheme for negotiating a transmission time in a time division multiplexed communication channel according to a heed to transmit asynchronous data within idle times of a transmission frame period is provided. According to such a scheme, transmissions of asynchronous data within the idle times are scheduled by devices utilizing the communication channel according to a clear channel assessment time and transmission characteristics, for example designated transmission time slots within the transmission frame period, of other devices transmitting within the channel.

These and other features and advantages of the present invention will be apparent from a review of the detailed description and its accompanying drawings that follow.

BRIEF DESCRIPTION OF THE DRAWINGS

The present invention is illustrated by way of example, and not limitation, in the figures of the accompanying drawings in which.

DETAILED DESCRIPTION

Figure 1:
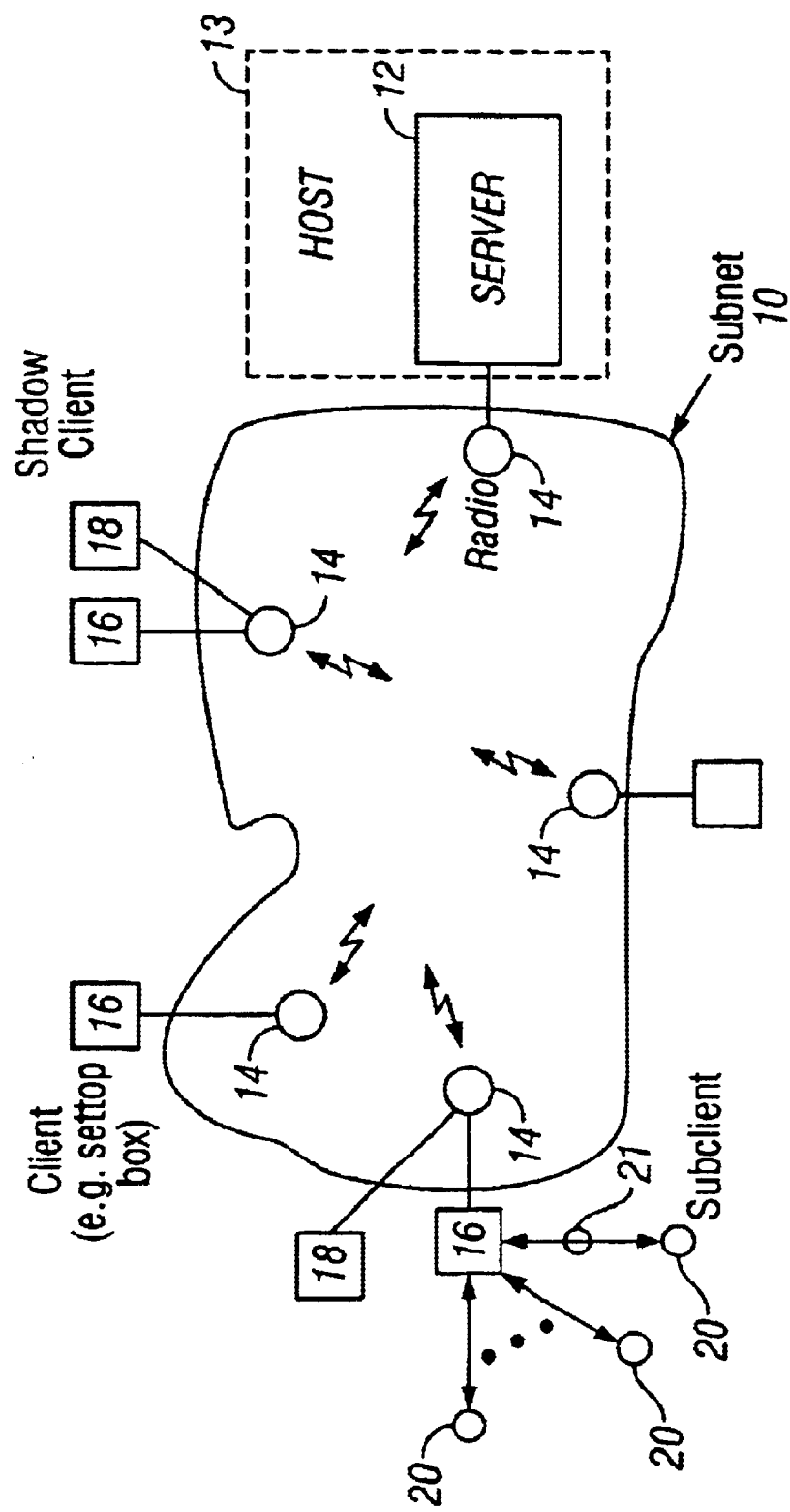
FIG. 1 illustrates a generalized network structure that is supported by a wireless protocol that is one embodiment of the present invention.
Figure 2:
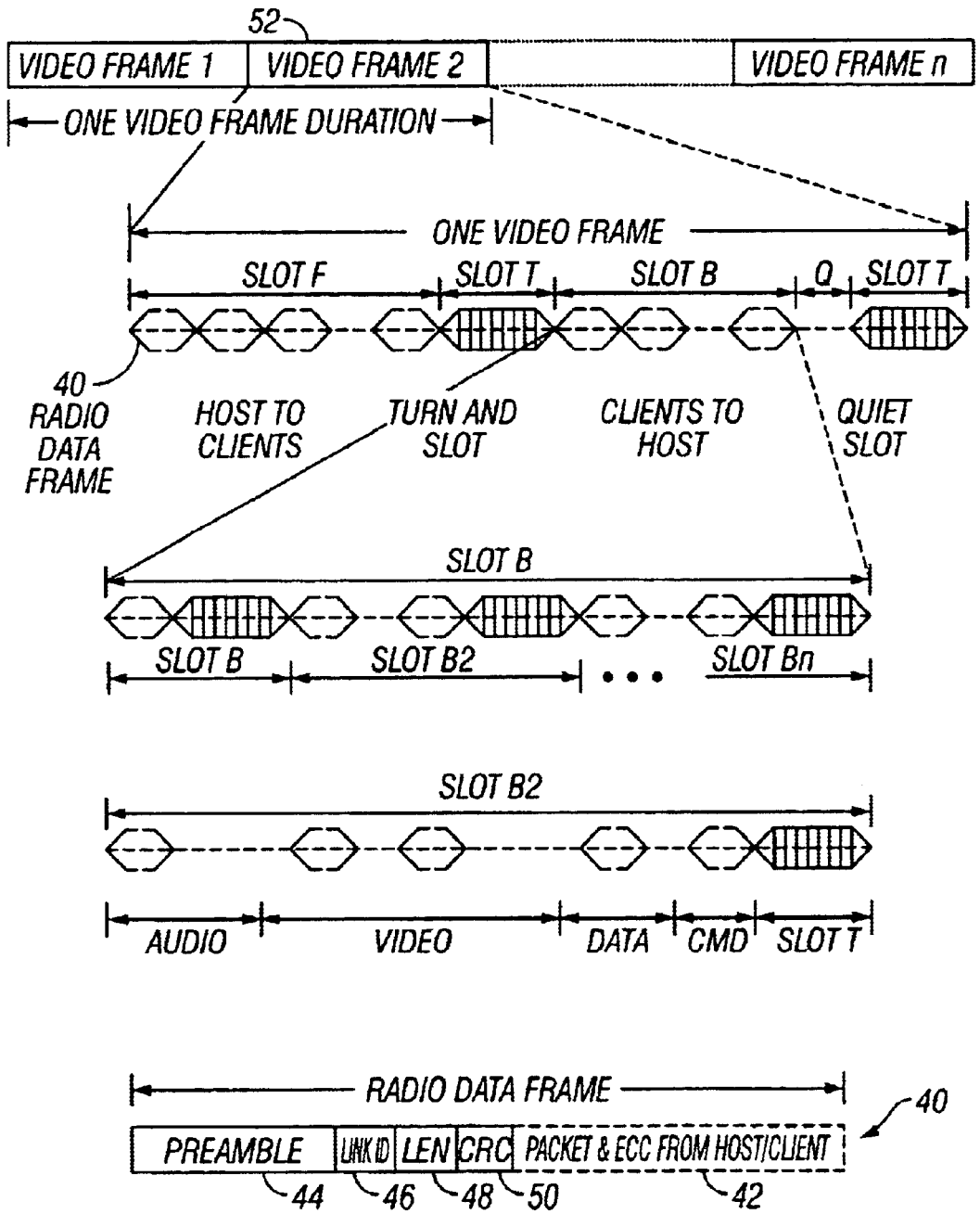
FIG. 2 illustrates a hierarchical arrangement for the transmission of data within a subnet according to one embodiment of the present invention.

Described herein is a scheme for avoiding latencies in asynchronous communications within a wireless communication channel of a computer network. The present scheme is generally applicable to a variety of network environments, but finds especially useful application in a wireless computer network which is located in a home environment. Thus, the present scheme will be discussed with reference to the particular aspects of a home environment. However, this discussion should in no way be seen to limit the applicability or use of the present invention in and to other network environments and the broader spirit and scope of the present invention is recited in the claims which follow this discussion.

One important term used throughout the following discussion is "channel". As indicated above, a channel is defined as the combination of a transmission frequency (more properly a transmission frequency band) and a pseudo-random (PN) code used in a spread spectrum communication scheme. In general, a number of available frequencies and PN codes may provide a number of available channels within a subnet. Network masters and clients are capable of searching through the available channels to find a desirable channel over which to communicate with one another. Table 1 below illustrates an exemplary channel plan according to this scheme.

TABLE 1

| Available Frequency Bands | Available PN Codes ||||
|---|---|---|---|---|
| | PN Code 1 | PN Code 2 | ... | PN Code n |
| Frequency Band 1 | Channel 11 | Channel 12 | ... | Channel 1n |
| Frequency Band 2 | Channel 21 | Channel 22 | ... | Channel 2n |
| ... | ... | ... | ... | ... |
| Frequency Band N | Channel N1 | Channel N2 | ... | Channel Nn |

In one embodiment, a channel plan using two frequency bands is adopted and details of channel selection within such a scheme is discussed in greater in the above-cited co-pending application.

As explained in greater detail in the above-cited co-pending application, when a client device 16 joins a subnet, the client receives a Connection Agreements (CAG) package from the network master device (e.g., server 12). This package includes, among other things, information regarding the forward and backward bandwidth (e.g., the slots of the channel) to which the new client 16 is entitled. In addition, the maximum number of bytes the new client 16 can send/expect in each data packet is set for each type of packet (e.g., video data, audio data, etc.). The Connection Agreements package may also contain information regarding the total number of data frames that the new client 16 needs to wait (i.e., before transmitting its traffic) from the start of server's transmission and the identification of the preceding client (i.e., the client that owns the preceding reverse transmission slot). The client is also assigned a unique session identifier (CS-ID).

In addition to receiving its unique CS-ID, each client is also provided (either as part of the Connections Agreement package or in another client-master exchange) with the CS-ID of the last device to transmit within a network frame 52 (i.e., the unique identifier of the last device that has an allocated time slot for transmission in the TDMA architecture of the channel). This allows each client to identify any idle times at the end of a network frame. By knowing when these idle periods commence, clients are able to take advantage of available, but otherwise unused, channel bandwidth for asynchronous data transmissions. Such idle times may appear for a variety of reasons, for example, some devices in the subnet 10 may not always make full use of their available transmission times. Also, the entire network frame period may be more than is needed to accommodate existing devices within the subnet 10, thus providing excess time at the end of such a period.

After receiving the Connection Agreements packet, the client 16 configures itself to transmit its data in its assigned time slot (e.g., $B_1$, $B_2$, etc.) and waits for that slot to come around. At the designated time slot, the client 16 may initiate normal communications with the server 12 and transmit any data or commands it may have. In order to help maintain proper time slot synchronization, part of this configuration process may involve programming an accurate slot timer (AST).

Figure 3:
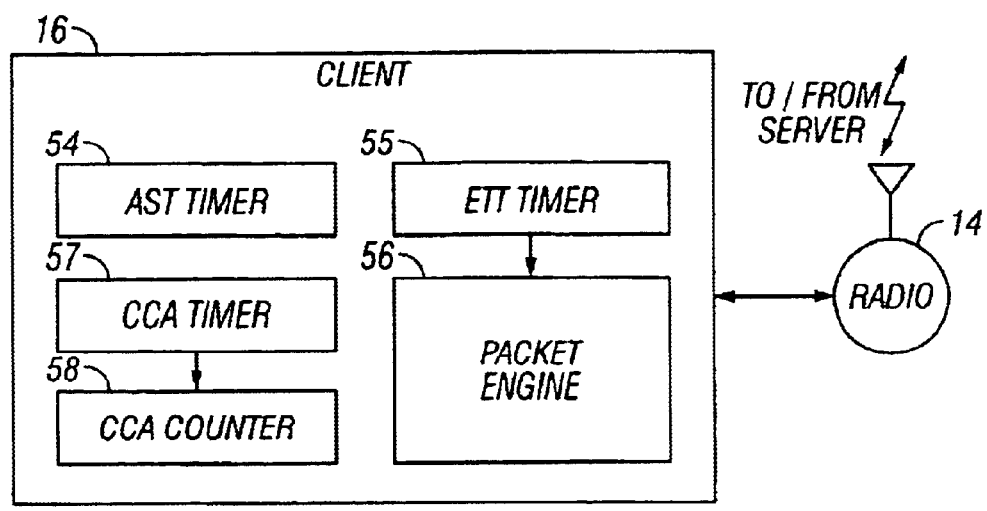
FIG. 3 illustrates a network client device configured with a collection of timers and counters, some of which may be used in accordance with one embodiment of the present invention.

FIG. 3 illustrates a client 16 configured with an AST 54. The AST 54 may be a conventional timer (e.g., a register or memory location, which is incremented or decremented on a regular basis according to an appropriate clock signal maintained by the client device) that is programmed using information provided by the network master as part of the connection process. For example, the network master (e.g., server 12) may provide the client 16 with an indication of where it lies in within the slotted link structure of the communication protocol (i.e., at what time it should begin its transmissions). By then monitoring this time using AST 54 (which may be reset upon each master transmission or each transmission of the associated client), the client 16 can accurately predict when it should begin its transmission. Of course, the expiration of an AST-monitored time should not allow transmission in the event a client detects that a preceding client has not yet completed its own transmissions. Otherwise, the transmissions may overlap and cause confusion within the network.

In conjunction with the use of an AST 54, a client 16 may also incorporate an early trigger timer (ETT) 55 to ensure that packets are ready for transmission within the subnet when the client's transmission slot arrives. That is, an ETT 55 may be used to advance the internal construction of a packet or packets for transmission, with the goal being to have those packets assembled and ready for transmission when the client's transmission slot becomes available. Thus the ETT 55 (which may be implemented as a conventional timer) triggers the process of formation of packets and their error protection bits, etc., using a packet construction engine 56 (which in some cases may be a part of client 16 or in other cases may be a part of radio 14) to keep a few packets, at least, prepared before the actual start of transmission. For example, in one embodiment packets could be assembled and stored for transmission one network frame in advance of their actual transmission. Such preassembly is helpful in avoiding the idle times on the channel when the first few packets for a transmission sequence are being formed. Although collecting data for one network frame in advance of transmission may penalize the system with a one network frame latency at the first transmission slot, it is expected that this period can be reduced to a few milliseconds.

As indicated above, each client 16 may be required to keep track of the present client occupying the channel, thereby trying to detect its immediately preceding client in line. If the channel is quiet, the current client waits for a predetermined length of time before starting its own transmission. In one embodiment, the length of this waiting time depends on the quiet time threshold allowed between two clients (termed the clear channel assessment or CCA time) and the number of clients yet to transmit before the current client. For example, the waiting time may be the product of the CCA threshold and the number of devices yet to transmit. This waiting time calculation thus makes use of the order of transmission that is established during the connection setup. The only exception to the quiet time is the Q slot, when all on-line clients 16 should refrain from transmitting.

As indicated, a CCA transmission (i.e., a client's transmission based on a waiting period timeout) is essentially the result of a decision made by the client that the channel is free and hence is suitable for transmission. Each client device keeps track of how many devices have completed the transmission from the time the network master completed its transmission. This can be done using a counter that is incremented each time a client transmission is detected and the implementation of such counters is well known in the art. Then, by knowing the index of its own position in the network frame (a value received from the network master at the time a connection is established), each client device can determine when to initiate a CCA transmission. This is best illustrated with an example.

Each client device may program an associated CCA timer 57 (see FIG. 3) to a predetermined value. The network master may specify this value at the time a master-client connection is established and it generally represents a period of time that must expire before a network client is permitted to assume that another client is not using the channel. Now, suppose a client device is 5$^{th}$ in line for transmission after the master device and suppose it detects a clear channel (e.g., because its CCA timer 57 times out) after the device that is second in line has completed its transmission. Because the device is 5$^{th}$ in line, it cannot immediately begin its own transmissions (after all, there are still two client devices in line ahead of it). However, the 5$^{th}$ device may increment an associated CCA counter 58 at this time. If then both the 3$^{rd}$ and 4$^{th}$ devices are silent (i.e., if the 5$^{th}$ device's CCA timer 57 times out two more times in succession), then the 5$^{th}$ device will have again twice incremented its CCA counter 58 and may immediately start its own transmission on the 3$^{rd}$ CCA detection.

Note that in the above example, the 3$^{rd}$ device in line will also have detected the absence of the second device's transmission and may therefore immediately start its own transmission if indeed it has traffic to send. In other words, the 3$^{rd}$ device's waiting period is only one CCA timeout from the absence of the 2$^{nd}$ device's transmissions, while that of the 5$^{th}$ device is three CCA timeout periods. Similarly, the 4$^{th}$ device in line is two CCA timeout periods away from the second device. This use of the client slot assignments in determining when CCA transmissions may be initiated allows the client devices to maintain their relative sequence with one another within the slotted link structure of the communication channel.

The CCA timeout period may also be used to detect idle times at the end of a network frame 52. For example, by knowing the CS-ID of the last device to transmit within the TDMA architecture, all clients 16 can determine when the idle time commences by monitoring the transmission of the client that is last in line. All clients 16 in the subnet 10 can then estimate the duration of the idle time after the last-in-line client has completed its transmission (by knowing the total available time for a network frame, which as indicated above, has a fixed duration). By sharing this available idle time amongst themselves, the clients 16 of the subnet 10 can provide for asynchronous data transmissions in the subnet 10. Of course, other methods of detecting idle times may be used.

The idle time "sharing" plan between the clients makes use of the CCA in that each client waits a time $T_{idle}=T_{CCA}*C$ (microseconds) before transmitting a packet in the idle time. $T_{CCA}$ may be the standard CCA time for a regular transmission and C may be determined as the difference between the transmission slot number of the current client and that of the client from which the immediately preceeding packet was received (or monitored). If the master device has any asynchronous data to transmit, it may use C=1 and begin its transmission from the time of the end of the transmission of the last-in-line client.

In order to provide a somewhat fair allocation scheme, in one embodiment each client is permitted to transmit only one packet in the idle time at the end of a network frame 52. This allows the devices in subnet 10 to take turns transmitting asynchronous (e.g., low priority) data over the channel. This protocol may be abandoned and a transmission commenced if a packet from a previous client is detected in the idle time and there is sufficient time in the idle period for a packet transmission. However, before any transmission in the idle time occurs, a device wishing to send data should allow sufficient time for the Q slot before the commencement of the next network frame.

Within the present scheme, there are some idle-time transmission situations that warrant further discussion. For example, consider the situation of a short idle time. Because the time at which a device may transmit in the idle time is determined by transmission slot number (C), it is possible that only a subset of the total number of network devices get the opportunity to make use of the idle time in each network frame period. To make idle time allocation more fair, the present scheme allows devices in a subnet 10 to request reallocation of its transmission slot by sending such a request to the network master. Thus, if a client determines that it has a significant amount of asynchronous traffic to send but that it is unable to do so because of its transmission slot number, that client can request a new transmission slot, earlier in a network frame period, so as to have a better chance of making use of the idle time at the end of the frame.

If a device wishes to transmit multiple packets within the idle time of a single network frame, a two-step process may be invoked. First, the device transmits an initial packet in its regular space in the idle time, determined according to the above protocol. Then, the device may reprogram its $T_{idle}$ time such that $T_{idle}=T_{CCA}*N$, where N is the total number of devices (including the master) in the subnet 10. The next idle time transmission for the subject device can then occur at this new $T_{idle}$ time, provided sufficient time remains before the Q slot. If a packet from another device is received before this new $T_{idle}$ time expires, the CCA may be reprogrammed to the time between the device's transmission and the reception of the newly received packet. This helps assure an equal opportunity for all devices in the subnet 10 to use the idle time for transmission of asynchronous data.

When a subnet 10 is sharing a channel with one or more overlapping subnets, the start and end of each subnet's transmission periods should be strictly limited to a time duration within each network frame 52. If there are idle times within such a duration, the devices in the subnets may make use of the time in the manner described above, however, such transmissions should not exceed the time duration of their respective subnet's transmission window.

During channel change situations (described in detail in the above-cited co-pending application), client devices are prohibited from transmitting until permitted to do so by the master device or certain time outs. This protocol should be strictly observed and idle time transmissions halted during such periods so that there is no loss of data within the subnet 10.

Packet size will play a role in determining how many devices are afforded the opportunity to transmit within an idle time. That is, even if a device's time for transmission in an idle time has arrived, that device should not transmit if it detects an ongoing transmission of another device. Also, devices sending smaller packets during an idle time may be benefited to a lesser extent than those transmitting larger packets, as a device is only (usually) able to transmit one packet per idle time. To balance this equation, and reduce the potential for collisions within an idle time, one embodiment of the present scheme restricts devices to a predetermined time duration for any such transmissions. In other words, only packets up to a predetermined size are eligible for transmission in an idle time.

Thus, a scheme for synchronizing communications within a computer network communication channel has been described. Although discussed with reference to certain illustrated embodiments, the present invention should not be limited thereby. Instead, the present invention should only be measured in terms of the claims that follow.

What is claimed is:

1. A method for improving network performance in a network having a slotted link architecture, the method comprising:

assigning a time slot within a network frame to each device in the network;

providing an unassigned time slot within each network frame, the unassigned time slot shared by the devices in the network for transmissions upon completion of regularly scheduled transmissions;

performing a clear channel assessment of a first device, taking into account the first device's designated transmission time slot within a network frame with respect to those of the other network devices; and transmitting data during the unassigned fine slot responsive to the clear channel assessment, wherein the clear channel assessment comprises waiting for the expiration of a time period that is the product of a predetermined clear channel waiting time and a numerical representation of the first device's designated transmission time slot within the communication channel.

2. The method of claim 1 wherein the predetermined clear channel waiting time is designated by a network master device upon a connection thereto by the first device.

3. A method comprising accommodating asynchronous data transmissions within a synchronized network, in which inter-node communications are organized into frames of time periods by permitting such asynchronous communications within otherwise idle times within those frames having unused idle times that occur upon completion of all regularly scheduled transmissions within such frames, wherein such unused idle times are shared by utilizing clear channel assessment by nodes within the network, wherein the clear channel assessment comprises waiting for the expiration of a time period that is the product of a predetermined clear channel waiting time and a numerical representation of the first node's designated transmission time slot within the communication channel.

4. The method of claim 3 wherein use of the idle times takes into account a transmitting node's designated transmission time within a particular frame with respect to transmission times of other nodes of the network.

5. The method of claim 3 wherein the asynchronous data transmissions are self-organized and/or self-synchronized by nodes of the network without direct scheduling assistance from a network master.

6. A method comprising:

allocating, for each of a number of clients of a computer network, a designated transmission time slot within each network frame period of a communication channel of the computer network;

establishing a common clear channel waiting time to be used by each of the clients of the computer network;

upon detecting an idle time at an end of a network frame period, those of the clients of the computer network having data to transmit sharing the idle time for transmissions of data according to a sharing plan that takes into account the common clear channel waiting time; wherein the sharing plan comprises those of the clients of the computer network having data to transmit each waiting a time $T_{IDLE}=T_{CCA}*C$ before transmitting a packet within the idle time, where $T_{CCA}$ is the common clear channel waiting time, and C is the difference between a client's designated transmission time slot and a transmission time slot of a last client to transmit within the channel.

7. The method of claim 6 wherein those of the clients of the computer network having data to transmit, transmit only one packet in the idle time.

8. The method of claim 7 wherein those of the clients of the computer network having data to transmit take turns transmitting asynchronous data over the channel in the idle time.

9. The method of claim 6, wherein those of the clients of the computer network having data to transmit take turns transmitting low priority data over the channel in the idle time.

10. The method of claim 6, wherein the sharing plan further takes into account each respective clients designated transmission time slot within network frame periods.

11. The method of claim 10, further comprising one of the clients of the computer network requesting a new designated transmission time slot earlier in each network frame period that a current designated transmission time slot of that client in order to have a better chance of making use of the idle time.

12. A method, comprising:

allocating for each of a number of clients of a computer network, a designated transmission time slot within each network frame period of a communication channel of the computer network;

establishing a common clear channel waiting time to be used by each of the clients of the computer network;

detecting an idle time at an end of a network frame period; and a first one of the clients of the computer network transmitting a packet in the idle time after waiting a time $T_{IDLE}=T_{CCA}*C$, where $T_{CCA}$ is the common clear channel waiting time, and C is a difference between the first clients designated transmission time slot and a transmission time slot of a last client to transmit within the channel.

13. The method of claim 12, further comprising the first client reprogramming its $T_{IDLE}=T_{CCA}*N$, where N is the total number of devices in the computer network.

* * * * *